Dec. 27, 1966  H. G. FLECK  3,294,975
PHOTO-DEVICE WITH SEGMENTED PHOTOCATHODE
Filed Nov. 1, 1962  2 Sheets-Sheet 1
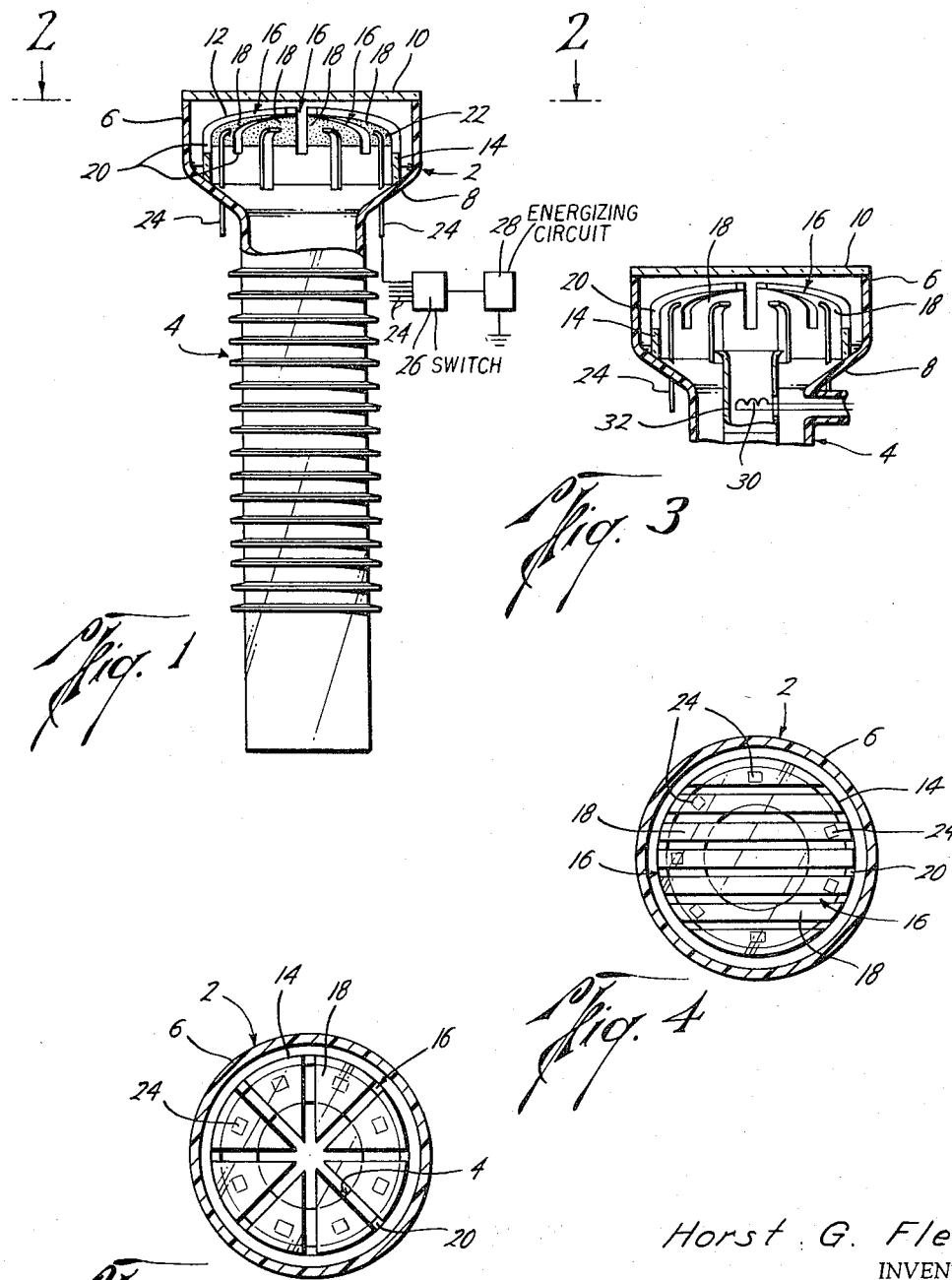
Horst G. Fleck
INVENTOR.
BY Robert M. Sperry
ATTORNEY Horst G. Fleck
INVENTOR.

BY Robert M. Sperry

ATTORNEY

United States Patent Office 3,294,975
Patented Dec. 27, 1966

3,294,975
PHOTO-DEVICE WITH SEGMENTED PHOTOCATHODE
Horst G. Fleck, Titusville, N.J., assignor to Electro-Mechanical Research, Inc., Sarasota, Fla., a corporation of Connecticut
Filed Nov. 1, 1962, Ser. No. 234,646
9 Claims. (Cl. 250—207)

This invention relates to photo-devices such as photomultiplier tubes and is particularly directed to novel photomultiplier tubes having a plurality of selectively sensitizable, photocathode segments.

The use of photomultiplier tubes in recent years has become extensive. This is particularly true in the art of detecting nuclear particles, such as gamma rays and neutrons, since when employed as "scintillation counters" with appropriate scintillation materials, they frequently indicate the energy as well as the presence of the incident particle. Even more recently, photomultiplier tubes have been found to be extremely useful as components of star tracking devices and the like in guidance systems for satellites and other space vehicles.

Unfortunately, photomultiplier tubes are rather large, the smalled available ones having a diameter of approximately one-half inch. Consequently, they have been unsuitable for many purposes. Thus, for example, multicrystal spectorscopy has been found extremely useful in laboratory experiments, and it has been suggested that considerable information concerning the formations surrounding oil wells and the like could be obtained if this technique could be employed in well-logging instruments. However, because of the space limitations of such instruments and because of the large dimensions of photomultiplier tubes, the devices heretofore proposed for accomplishing this have been extremely complex and no such device is presently commercially practical. Similarly, most star tracking devices require the use of a cluster of photomultiplier tubes, whereas the dimensional limitations of space vehicles dictate against this.

These disadvantages of prior art photomultiplier tubes are overcome with the present invention, and a novel photomultiplier tube is provided which may be employed to distingish scintillations occurring in a plurality of separate scintillators, to detect variations in the position of a light beam incident on the photomultiplier tube, or to perform numerous other functions which have either been impossible with the photomultiplier tubes of the prior art or which have required highly complex and expensive mechanical or electronic apparatus.

The advantages of the present invention are preferably obtained by providing a novel photomultiplier tube employing a segmented photocathode wherein each of the segments thereof may be selectively and independently sensitized. In this way, the photomultiplier tube of the present invention permits the use of a single photomultiplier for independent, substantially simultaneous detection of incident light. On the other hand, if desired, the various photocathode segments may be sensitized sequentially to permit the photomultiplier tube to scan or "sweep" a light source or image as a function of time and, thereby, provide an indication of the location of the same or to detect variations in the position of a light beam incident on the photomultiplier tube, such as might result from changes in the orientation of a space ship with respect to a star. In addition, numerous other methods may be employed for independently sensitizing any one or more of the various photocathode segments to accomplish results which have been completely unthinkable with the photomultiplier tubes of the prior art.

Accordingly, it is an object of the present invention to provide an improved photomultiplier tube.

A further object of the present invention is to provide a novel photomultiplier tube which is capable of scanning a selected area as a function of time.

Another object of the present invention is to provide a novel photomultiplier tube which is capable of detecting variations in the position of a light beam incident thereon.

A specific object of the present invention is to provide a novel photomultiplier tube having a segmented photocathode wherein each of the segments thereof may be selectively and independently sensitized.

These and other objects and features of the present invention will be apparent from the following detailed description taken with reference to the figures of the accompanying drawing.

In the drawing:

FIG. 1 is a side view, partly in section, through a photomultiplier tube embodying the present invention;

FIG. 2 is transverse section of the photomultiplier tube of FIG. 1 taken on the line 2—2 thereof;

FIG. 3 is an enlarged view showing the photocathode portion of the photomultiplier tube of FIG. 1 during construction;

FIG. 4 is a view, similar to that of FIG. 2, showing an alternative form of the photomultiplier tube of FIG. 1.

Figure 5:
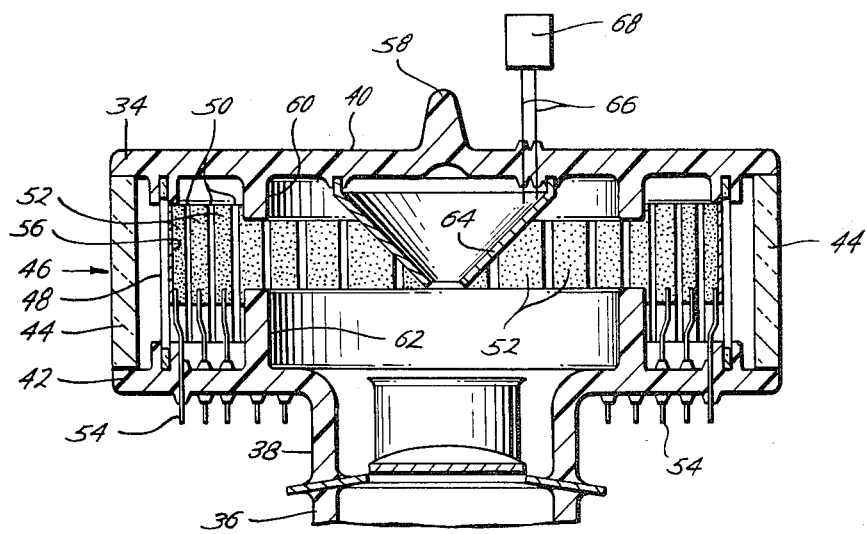
FIG. 5 is an enlarged view, partly in section, showing the photocathode portion of a further alternative form of the photomultiplier tube of FIG. 1.

In that form of the present invention chosen for purposes of illustration in FIGS. 1 and 2, a photomultiplier tube is shown having a photocathode portion, indicated generally by arrow 2, and a generally cylindrical dynode portion, indicated generally by arrow 4. The novel features of the present invention are found primarily in the photocathode portion 2, while the dynode portion 4 may be conventional and the structure thereof is not shown in detail.

The photocathode portion 2 is provided with a head 6 formed of electrically nonconductive material and having a diameter which is preferably equal to or greater than that of the dynode portion 4. As shown, the head 6 is joined to the dynode portion 4 by a flared neck 8 which is also formed of electrically nonconductive material. The head 6 supports a face plate 10 formed of transparent material and serves to admit light to the photocathode portion 2 of the photomultiplier tube. Within the head 6 is mounted a curved window 12 which is formed of transparent material and is supported from the neck 8 by a cylindrical, insulating member 14 formed of electrically nonconductive material. Window 12 is provided with a plurality of slots 16 extending therethrough which divide the window 12 into a plurality of segments, as best seen at 18 in FIG. 2. While FIG. 2 shows window 12 as being divided into eight equal segments 18, it will be obvious that window 12 may be divided into substantially any number of segments and that the segments need not be equal. The slots 16 serve to electrically insulate the segments 18 from each other and preferably extend a substantial distance into cylindrical member 14, as indicated at 20 in FIG. 1. The purpose for this will be explained hereinafter in connection with the description of the method of fabricating the photomultiplier tubes of the present invention. A light responsive, electrically conductive film 22 of a suitable photoemissive material, such as cesium antimonide, is deposited on the inner surface of each of the segments 18, and a plurality of electrically conductive leads 24 is provided which extends through the neck 8 of the tube and each serves to provide an independent, selective, external, electrical connection for the conductive film 22 on a respective one of the segments 18 through a suitable switch 26 to a suitable energizing circuit 28. Switch 26 and energizing circuit 28 may be standard, commercial items and hence are not shown in detail.

With the structure thus described, it will be apparent that each of the segments 18, with its respective film 22 and lead 24, effectively comprises an electrically distinct or independent photocathode which, together with the dynode portion 4 of the tube, is capable of establishing an independent electrical signal indicative of the intensity of any light incident on that particular one of the segments 18. The segments 18 are electrically insulated from each other by the cuts 16 and the nonconductive member 14. Thus, each of the segments 18 is electrically independent of the others and the various segments may be individually energized in a wide variety of ways by appropriately connecting the energizing source 28 to the respective leads 24 to accomplish many effects which have been difficult or impossible with the photomultiplier tubes of the prior art.

Switching means 26 could be employed to connect the energizing circuit alternately to the respective leads 24 at a frequency such that substantially continuous detection from both is obtained. The output of the photomultiplier tube could be transmitted to the surface as a single signal, and could then be separated by a second switching means synchronized with switch 26 to provide two separate signals for recording. The circuitry required for such a system would be much less complicated than that of prior art systems which require separate photomultiplier tubes for each, yet would accomplish the same result.

As an alternative method of employing the photomultiplier tube of the present invention, the window 12 could be divided into a large number of segments 18 which could all be arranged to detect a signal or image from a light source, and switch 26 could be employed for connecting the energizing circuit to the respective segments 18 sequentially to effectively cause the photomultiplier tube to "sweep" or "scan" the same as a function of time. This would provide an indication of relative intensities of light impinging on the segments from which position or the like could be determined. Such a device would be extremely useful in guidance circuits for satellites or the like; for example, light from a star could be formed by a suitable lens system to provide a spot on the center of the window 12 when the space vehicle was properly oriented. Any disorientation of the vehicle would displace the spot onto one or more of the segments 18, thereby providing an indication of the direction and amount of the disorientation. This would be a significant improvement over the mechanical chopping techniques which are currently employed.

The photomultiplier tube of the present invention may be fabricated with only slight alteration of conventional methods. Referring to FIGS. 1, 2, and 3, the tube is assembled with a removable evaporator 30 containing the photocathode material positioned in an evaporator shield 32, as shown in FIG. 3, in the manner disclosed in U.S. Patent No. 2,977,252, issued March 28, 1961 to Causse and Lallemand. The window 12 is preferably disposed so that all points on the inner surface thereof are substantially equidistant from the center of evaporator 30. Window 12 is mounted in the head 6 by means of cylindrical, insulating member 14, as described above, and slots 16 are cut to divide window 12 into the desired number of segments 18. The slots 16 are cut to extend into member 14 to a point substantially beyond the path of ions emitted by the evaporator and, as shown in the FIG. 2 (enlarged for convenience of illustration), are sized to provide the desired close uniform spacing between segments. Extension of the cut into member 12 assures that there will be no electrical leakage path between the individual photocathodes provided by the segments 18 despite their close spacing. The face plate 10 is then secured to the head 6 and the tube is evacuated. Subsequently, evaporator 30 is energized and the photocathode material is evaporated to form the photocathode film 22 on the inner surface of the segments 18 of window 12. Some of the atoms from evaporator 30 will pass through the slots 16 and will be deposited on the face plate 10. Consequently, the photocathode film 22 will not be continuous across the entire window 12. Instead, the film 22 will be deposited on the segments 18, and since the segments 18 are separated by the slots 16, the result will be that each of the segments 18 becomes an independent photocathode. The photocathode film 22 on each of the segments 18 may be individually energized by means of the associated lead 24, as described above. Since there is no electrical connection to face plate 10, those ions from evaporator 30 which pass through slots 16 and are deposited on the face plate 10 will not be energized and, hence, will not interfere with the functioning of the tube in the desired manner. After the film 22 has been deposited, the evaporator 30 may be removed in the manner disclosed in the above-identified patent of Causse et al. Thereafter, the tube may be processed in a conventional manner and shield 32 then serves to guide electrons to the first dynode in the dynode portion of the tube. These latter steps may be accomplished in a conventional manner and do not affect the present invention. By constructing the photomultiplier tube of the present invention in this way, the photocathode film 22 on all of the segments 18 will be identical. Consequently, the independent photocathodes formed thereby will be uniform in response and will all be affected identically by such factors as temperature, aging, and the like.

In the form of the invention shown in FIGS. 1 and 2, the slots 16 are cut radially of the window 12 so that the resulting segments 18 are substantially wedge-shaped. However, the present invention is not restricted to this configuration. As shown in FIG. 4, the slots 16 may be cut parallel to each other to divide the window 12 into a plurality of strip photocathodes, each of which may be independently energized by means of the respective leads 24, as described above with respect to the form of the invention shown in FIGS. 1 and 2.

FIG. 5 illustrates an alternative form of photomultiplier tube embodying the present invention which is intended for use where light is incident at a substantial angle to the axis of the tube. Such devices are generally referred to as "side-window" photomultiplier tubes, whereas tubes of the type illustrated in FIGS. 1–4 are generally referred to as "end-window" photomultiplier tubes. In the form of the invention shown in FIG. 5, the photocathode portion 34 of the tube is connected to the dynode portion 36 by neck 38. The photocathode portion 34 comprises a head 40 and a base 42 which are preferably formed of a nontransparent, electrically insulating material, such as ceramic. If desired, base 42 may be formed integral with neck 38, as shown. A wall 44 formed of transparent material structurally connects head 40 with base 42 and serves to admit light to the photocathode portion 34 from the direction indicated generally by arrow 46. Within the photocathode portion 34, a window 48 is mounted, spaced from wall 44 and secured, in any suitable way, to the head 40 and base 42. As shown, window 48 and wall 44 are formed generally cylindrical. However, it will be apparent that either or both of these elements could be made concave or convex and, if desired, wall 44 could be formed to serve as a lens to aid in focusing light on window 48.

A plurality of cuts 50 extends through the window 48 and serves to divide window 48 into a plurality of segments 52, and a plurality of electrically conductive leads 54 is provided, each of which engages the inner surface of a respective one of the segments 52 of window 48 and extends through base 42 to provide an external electrical connection for the respective segment 52, in the same manner as described above with respect to leads 24 of the device of FIG. 1. In addition, a film 56 of photocathode material is deposited on the inner surfaces of the segments 52, in substantially the same manner as described above with respect to the deposition of film 22 in FIG. 3. In the instant form of the invention, the evaporator is inserted through a centrally located opening in the head 40 which is pinched off after removal of the evaporator, as indicated by stub 58. Projections 60 and 62 extend, respectively, from head 40 and base 42, in opposing relation, between the central opening and window 48 and serve as shields to prevent deposition of the photocathode material on undesired areas of the head 40 and base 42 to assure that each of the photocathodes formed by the segments 52 is electrically independent.

After the photocathode film 56 has been deposited and the evaporator has been removed, a conical electrode 64, which is preferably formed of opaque material, is mounted centrally of the head 40 and is provided with a conductive lead 66 which extends through the head 40 to a suitable source of negative voltage, indicated by block 68. Thus, electrode 64 serves to deflect electrons emitted by the film 56 on the segments 52 into the dynode portion 36 of the photomultiplier tube and also prevents light, incident on one side of the photomultiplier tube, from passing through the tube is activate the segments 52 on the opposite side of the tube.

In operation, each of the segments 52 serves as a separate photocathode which is independently and selectively energizable by means of the respective leads 54, in the same manner as described above for the segments 18 of the device of FIG. 1. Moreover, by sequentially energizing the segments 52, the device of FIG. 5 may be made to detect in a rotating manner, similar to that of a radar receiver, and can provide a signal which will indicate the radial position of a light source.

Many other configurations will be apparent within the teaching of the present invention. In addition, it may be desirable to energize two or more of the segments simultaneously. This may obviously be accomplished by simply connecting the energizing circuit to the appropriate leads. Numerous other variations and modifications may also be made without departing from the present invention. Accordingly, it should be understood that the forms of the invention described above and shown in the figures of the accompanying drawings are illustrative only and are not intended to limit the scope of the present invention.

What is claimed is:

1. A photomultiplier tube having a photocathode portion and a dynode portion; a window mounted in said photocathode portion; slot means cut in said window thereby defining at least two segments; photoemissive means disposed on each of said segments for producing electrons which are multiplied by said dynode portion; and means for selectively and independently connecting the photoemissive means on each of said segments to an energizing circuit.

2. A photomultiplier tube having a photocathode portion and a dynode portion; said photocathode portion comprising a head, a neck joining said head with said dynode portion, a window formed of transparent material, an electrically insulating member supporting said window within said head, a plurality of slots cut through said window to divide said window into a plurality of segments; said slots extending a substantial distance into said insulating member; photoemissive means disposed on each of said segments; and means for selectively and independently connecting the photoemissive means on each of said segments to an energizing circuit.

3. A photomultiplier tube having a photocathode portion and a dynode portion; a window mounted in said photocathode portion, a plurality of slots cut through said window and extending radially thereof to divide said window into a plurality of wedge-shaped segments; photoemissive means disposed on each of said segments; and means for selectively and independently connecting the photoemissive means on each of said segments to an energizing circuit.

4. A photomultiplier tube having a photocathode portion and a dynode portion, said photocathode portion comprising a head, a neck joining said head with said dynode portion, a window formed of transparent material, at least two distinct segments on said window, an electrically insulating member supporting said window within said head, light responsive means on said segments, and means for selectively and independently connecting said light responsive means on each of said segments to an energizing circuit.

5. A photomultiplier comprising an electrically insulating cylindrical member, a round window formed of transparent material supported along an edge thereof by one end of said cylindrical member, said window having radial slots therein to divide the same into a plurality of segments, a photocathode deposited on each segment of said window and spaced apart by said slots so that each photocathode is electrically insulated from the others and may be selectively energized, and dynode means supported with respect to said window so as to be responsive to photoelectrons from the photocathode on each of said segments.

6. A photomultiplier comprising a window formed of transparent material, said window having slots therein to divide the same into a plurality of segments, a photocathode vacuum deposited on each segment of said window and spaced apart by said slots so that each photocathode is electrically insulated from the others, lead means for applying an energizing voltage selectively to each photocathode, and means supported with respect to said window so as to be responsive to photoelectrons from the photocathode on each of said segments.

7. A photo-device for tracking stars or the like comprising an electrically insulating member, a window formed of transparent material supported by said member, said window having slots therein to divide the same into a plurality of segments, a photocathode deposited on each segment of said window and spaced apart by said slots so that each photocathode is electrically insulated from the others, means supported with respect to said window so as to be responsive to photoelectrons from the photocathode on each of said segments, and means for selectively energizing each photocathode to emit photoelectrons in response to light impinging thereon.

8. A photo-device comprising an electrically insulating member, a plurality of closely spaced window segments supported by said member, photoemissive means vacuum deposited on each of said segments and thereby spaced apart so that each photoemissive means is electrically insulated from the others, lead means for selectively energizing each photocathode, and means supported with respect to said segments so as to be responsive to photo-emission from the photo-emissive means on each of said segments.

9. A photo-device comprising a support member, a plurality of closely spaced segments supported by said member and arranged as sectors about a common point, a photocathode deposited on each of said segments and thereby spaced apart so that each photocathode is electrically insulated from the others, means supported with respect to said segments so as to be responsive to photoelectrons from the photocathode on each of said segments, and means for selectively energizing each of said photocathodes to emit photoelectrons in response to light impinging thereon.

References Cited by the Examiner

UNITED STATES PATENTS

| | | | |
|---|---|---|---|
| 1,870,596 | 8/1932 | Woodward | 313—96 |
| 1,889,431 | 11/1932 | Berg et al. | 313—96 |
| 2,227,095 | 12/1940 | Liebmann | 250—207 |
| 2,244,318 | 6/1941 | Skellett | 250—207 |
| 2,410,115 | 10/1946 | Varian | 250—207 X |
| 2,492,148 | 12/1949 | Herbold | 313—96 X |
| 2,821,637 | 1/1958 | Roberts et al. | 250—213 |
| 2,922,216 | 1/1960 | McIlvaine | 29—25.13 |
| 2,943,382 | 7/1960 | Harjes | 29—25.13 |
| 3,068,360 | 12/1962 | Nicoll | 250—213 |
| 3,202,853 | 8/1965 | Weimer | 313—65 |

RALPH G. NILSON, *Primary Examiner.*

WALTER STOLWEIN, *Examiner.*